(12) United States Patent
Ratcliff et al.

(10) Patent No.: US 9,182,817 B2
(45) Date of Patent: Nov. 10, 2015

(54) TECHNIQUES FOR AUTOMATED EVALUATION OF 3D VISUAL CONTENT

(71) Applicant: Intel Corporation, Santa Clara, CA (US)

(72) Inventors: Joshua J. Ratcliff, San Jose, CA (US); Analia Ibargoyen, San Francisco, CA (US)

(73) Assignee: INTEL CORPORATION, Santa Clara, CA (US)

( * ) Notice: Subject to any disclaimer, the term of this patent is extended or adjusted under 35 U.S.C. 154(b) by 215 days.

(21) Appl. No.: 13/797,931

(22) Filed: Mar. 12, 2013

(65) Prior Publication Data
US 2014/0267001 A1  Sep. 18, 2014

(51) Int. Cl.
| G06T 15/00 | (2011.01) |
| G06F 3/01 | (2006.01) |
| H04N 13/00 | (2006.01) |
| H04N 13/02 | (2006.01) |
| G06T 17/00 | (2006.01) |
| G06T 19/00 | (2011.01) |
| H04N 13/04 | (2006.01) |
| G06F 3/0481 | (2013.01) |

(52) U.S. Cl.
CPC ............ *G06F 3/013* (2013.01); *G06T 17/00* (2013.01); *G06T 19/00* (2013.01); *H04N 13/0022* (2013.01); *H04N 13/0033* (2013.01); *H04N 13/0271* (2013.01); *H04N 13/0484* (2013.01); *G06F 3/04815* (2013.01)

(58) Field of Classification Search
None
See application file for complete search history.

(56) References Cited

U.S. PATENT DOCUMENTS

| 7,372,987 | B2 * | 5/2008 | Tokuhashi et al. | 382/154 |
| 8,009,188 | B2 | 8/2011 | Sugahara et al. | |
| 8,094,927 | B2 * | 1/2012 | Jin et al. | 382/154 |
| 8,390,674 | B2 * | 3/2013 | Kim et al. | 348/42 |
| 8,963,913 | B2 * | 2/2015 | Baek | 345/419 |
| 2009/0315981 | A1 * | 12/2009 | Jung et al. | 348/43 |
| 2010/0039504 | A1 * | 2/2010 | Takahashi et al. | 348/54 |
| 2011/0032328 | A1 * | 2/2011 | Raveendran et al. | 348/43 |
| 2011/0081042 | A1 * | 4/2011 | Kim et al. | 382/100 |
| 2011/0109731 | A1 * | 5/2011 | Koo et al. | 348/51 |
| 2011/0141248 | A1 | 6/2011 | Watabu et al. | |

(Continued)

OTHER PUBLICATIONS

International Search Report and Written Opinion received for PCT Patent Application No. PCT/2014/018257, mailed Jun. 2, 2014, 10 pages.

(Continued)

*Primary Examiner* — Dismery Mercedes
(74) *Attorney, Agent, or Firm* — Kacvinsky Daisak Bluni PLLC

(57) ABSTRACT

Various embodiments are generally directed to automatically observing reactions of viewers of 2D and 3D versions of the same visual content, and comparing aspects of those observations for indications of fatigue in the viewing of the 3D version. An apparatus includes a processor element; and logic to compare a first ROI (region of interest) data associated with a first viewer of a first visual presentation of a 2D (two-dimensional) version of visual content to a second ROI data associated with a second viewer of a second visual presentation of a 3D (three-dimensional) version of the visual content; and identify an instance of a statistically significant difference in a region of interest between the first ROI data and the second ROI data for at least one frame of the visual content indicative of an instance of viewing fatigue of the second viewer. Other embodiments are described and claimed.

14 Claims, 10 Drawing Sheets

(56) References Cited

U.S. PATENT DOCUMENTS

| | | | | |
|---|---|---|---|---|
| 2012/0038631 | A1* | 2/2012 | Mayhew et al. | 345/419 |
| 2012/0120202 | A1* | 5/2012 | Yoon et al. | 348/49 |
| 2012/0127422 | A1* | 5/2012 | Tian et al. | 351/158 |
| 2012/0182299 | A1* | 7/2012 | Bowles et al. | 345/426 |
| 2012/0274629 | A1* | 11/2012 | Baek | 345/419 |
| 2013/0044291 | A1* | 2/2013 | Kato et al. | 351/209 |
| 2014/0028662 | A1* | 1/2014 | Liao et al. | 345/419 |

OTHER PUBLICATIONS

Ebert, Roger, "Why 3D Doesn't Work and Never Will. Case Closed", <http://www.rogerebert.com/rogers-journal/why-3d-doesnt-work-and-never-will-case-closed>, Jan. 23, 2011, 5 pages.

* cited by examiner

TECHNIQUES FOR AUTOMATED EVALUATION OF 3D VISUAL CONTENT

TECHNICAL FIELD

Embodiments described herein generally relate to automated evaluation of fatigue effects of 3D visual content (e.g., 3D movies and television programs) on viewers.

BACKGROUND

With the recent proliferation of televisions and other viewing devices capable of effectively presenting three-dimensional (3D) visual content, there has been a recent accompanying growth in the amount of 3D visual content. However, much is still poorly understood about the effects that viewing 3D visual content has on viewers. Stated differently, although there is anecdotal evidence of adverse effects, including dizziness and fatigue, on viewers of 3D content, little has been done to quantify various possible factors that may or may not contribute to these effects.

With such a lack of information, those who create 3D visual content tend to rely on their own personal experiences in various experiments in using three dimensions in creating visual content. However, this results in reliance of mostly personal observations taken from a relatively small number of individuals. As those skilled in the art of statistical analysis applied to human subjects will readily recognize, such an approach invites to much subjective influence and is highly likely to lead to skewed results.

Further, there is a strong desire among those who create 3D visual content to use various aspects of the depth dimension available in 3D visual content as a tool to control the mood in various scenes in much the same way they typically use lighting, music, camera angles and field of view as tools to do so. Unfortunately, with a lack of information concerning the effects of how they do so, there is little guidance available as to when or how to limit such use of the depth dimension. It is with respect to these and other considerations that the embodiments described herein are needed.

DETAILED DESCRIPTION

Figure 1:
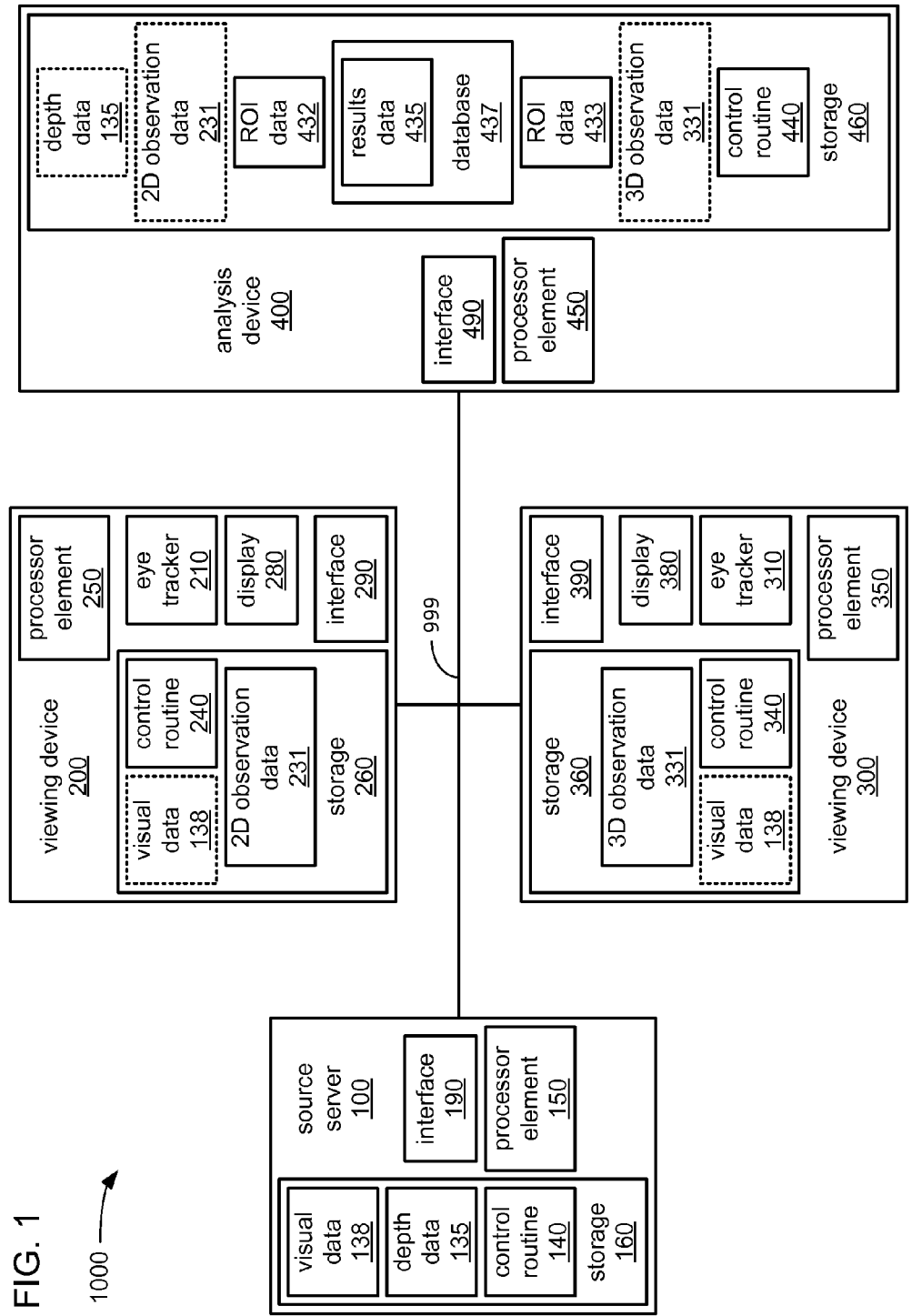
FIG. 1 illustrates aspects of an embodiment of interactions among computing devices.

Various embodiments are generally directed to automatically observing reactions of viewers of 2D and 3D versions of the same visual content, and comparing aspects of those observations for indications of fatigue in the viewing of the 3D version. More specifically, an analysis is performed to identify statistically significant increases in instances of various responses of the viewers of the 3D version over instances of those same responses of the viewers of the 2D version. Such responses include looking away from the screen, body movements indicative of physical discomfort, and instances of loss smooth pursuit of movement of depicted moving objects.

Also, an analysis is performed to identify portions of the 3D version during which there is a statistically significant increase in instances of various eye responses over instances of those same eye responses during other portions of the 3D version. Such eye responses include instances of ocular vergence remaining fixed at the plane of the screen at a location of the content despite vergence of the content at that location at a different depth, and instances of relatively slow changes in ocular vergence at a location of the content in response to a changes in vergence of the content at that location.

The results of these analyses for a particular piece of 3D visual content may be employed to determine what portions may need to be modified and/or to what degree to reduce viewing fatigue. Alternatively or additionally, the results of these analyses may be added to a database of frame-by-frame statistics from various pieces of 3D visual content. The frame-by-frame statistics include one or more parameters of each frame correlated to indications of viewer and eye responses indicative of viewing fatigue to enable associations and/or possible causal effects to be derived between viewing fatigue and one or more parameters of 3D visual content. The discovery of such associations may then be employed in the creation of 3D visual content that causes less viewing fatigue, thereby enabling a more positive viewing experience.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 depicts a block diagram of aspects of interactions among computing devices of a viewing analysis system 1000 including one or more of a source server 100 to provide 2D and 3D versions of visual content for viewing, viewing devices 200 and 300 to visually present those versions, and an analysis device 400 to analyze viewer responses. Each of these computing devices 100 and 500 may be any of a variety of types of computing device, including without limitation, a desktop computer system, a data entry terminal, a laptop computer, a netbook computer, an ultrabook computer, a tablet computer, a handheld personal data assistant, a smartphone, a digital camera, a mobile device, a body-worn computing device incorporated into clothing, a computing device integrated into a vehicle, a server, a cluster of servers, a server farm, etc.

As depicted, these computing devices 100, 200, 300 and 400 may exchange signals concerning visual content and viewer responses thereto. However, one or more of these computing devices may exchange other different and entirely unrelated data. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. It should also be noted that such data may alternatively be exchanged between two more of these computing devices via removable storage (e.g., a solid-state storage based on FLASH memory technology, an optical disc medium, etc.).

In various embodiments, the source server 100 incorporates one or more of a processor element 150, a storage 160 and an interface 190 to couple the source server 100 to the network 999. The storage 160 stores one or more of a control routine 140, visual data 138 and depth data 135. The visual data 138 includes at least one piece of 3D visual content such as and not limited to a movie, television program, etc., stored with left and right frames enable a 3D visual presentation to viewers. In executing a sequence of instructions of the control routine 140, the processor element 150 is caused to provide two-dimensional (2D) and three-dimensional (3D) versions of the visual data 138 to various viewing devices, such as the viewing devices 200 and 300. Such provision may be made by the processor element 150 transmitting the 2D and 3D versions to viewing devices via the network 999 and/or through removable storage. More specifically, the processor element 150 is caused to provide the 3D version by providing both left and right frames of the visual data 138 to some viewing devices to enable a 3D visual presentation. However, in providing the 2D version, the processor element 150 may provide only one of the left frames or the right frames to other viewing devices. Alternatively, the processor element 150 may derive a set of frames of the 2D version from a combining of the left and right frames using any of a variety of known techniques.

The depth data 135 includes an indication of the depth of each pixel of each frame of the 3D visual content of the visual data 138. In essence, the depth data 135 is a per-frame depth map for the pixels in each frame. Depending on the manner in which the 3D visual content of the visual data 138 was created, the depth data 135 may be provided to the source server 100 along with the visual data 138 as a byproduct of the process by which the visual data 138 was created. By way of example, where 3D visual content is generated entirely through computer-based rendering of objects and scenery, the depth of each pixel of each frame is already known as it is part of the data required to perform such rendering such that it can be provided to the source server 100 as the depth data 135. However, where the depth data 135 is not so provided, the processor element 150 may derive the depth data 135 from left and right imagery making up each frame of the visual data 138 by any of a variety of known techniques.

In various embodiments, the viewing device 200 incorporates one or more of a processor element 250, a storage 260, a display 280, an eye tracker 210, and an interface 290 to couple the viewing device 200 to the network 999. The storage 260 stores one or more of a control routine 240, at least a portion of the visual data 138 and a 2D observation data 231. In executing a sequence of instructions of the control routine 240, the processor element 250 is caused to receive at least a portion of the visual data 138 from the source server 100, enabling a 2D visual presentation of visual content of the visual data 138. The processor element 250 then visually presents that 2D visual presentation on the display 280. As previously explained, the source server 100 provides a 2D version of visual content of the visual data 138 to viewing devices that provide a 2D visual portion such that the source server 100 does not provide both left side and right imagery side for each frame of visual content it provides to the viewing device 200. However, in alternate embodiments, the source server 100 may provide a 3D version to the viewing device 200 such that both the left side and right side imagery is provided. In such embodiments, the viewing device 200 may visually present only a selected one of left side or right side imagery on the display 280.

Figure 2:
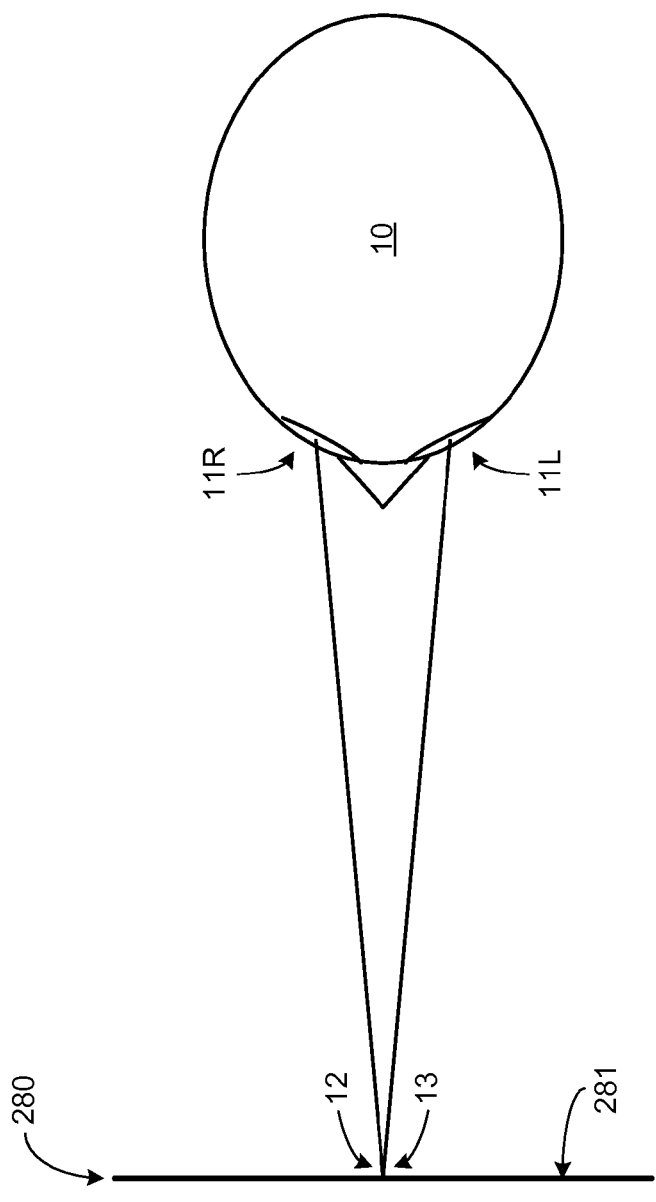
FIG. 2 illustrates aspects of viewing two-dimensional content.

FIG. 2 depicts aspects of a viewer 10 viewing a 2D version of visual content on the display 280. As will be familiar to those skilled in the art, the two eyes in human binocular vision make use of at least two sets of muscles causing two different kinds of movement when normally viewing an object. One set of muscles rotates each eye in a coordinated manner called vergence in which the lines of sight of each eye are caused to converge at a common point on the object at what is known as the convergence point. Another set of muscles within each eye reshapes the lens in each eye to adjust the focus of each to bring a common focal point for both eyes into focus in another coordinated action called accommodation. In almost all normal viewing situations, the convergence point and the common focal point of both eyes is substantially the same point on the object being viewed. This same coincidence of the convergence point and common focal point occurs when viewing 2D visual content on a screen, regardless of whether it is a reflective screen of a movie theatre, a liquid crystal display (LCD), the face of a cathode ray tube (CRT) display, etc. As depicted in FIG. 2, the convergence point 12 and the common focal point 13 of eyes 11L and 11R of the viewer 10 are at substantially the same point on the plane 281 of the face of the display 280. Stated differently, the convergence point 12 and the common focal point 13 are both at substantially the same location on the display 280 horizontally and vertically from the perspective of the viewer 10, and at substantially the same depth from the perspective of the viewer 10 (i.e., distance from the eyes 11L and 11R). As a result, viewing of 2D visual content on the display 280 is handled by the eyes 11L and 11R in much the same way as the normal viewing of an object that is not visually presented on any form of display.

Returning to FIG. 1, as the 2D version of the visual content from the visual data 138 is visually presented on the display 280, the processor element 250 is further caused to operate the eye tracker 210 to track eye movements and lines of sight of eyes of one or more viewers of that visual program on the display 280. The eye tracker 210 may be based on any of a variety of technologies for detecting the direction of the gaze (i.e., line of sight) of one or more viewers' eyes. In some embodiments, a combination of infrared light output and reception may be used in which infrared light reflected from the eyes of viewers is analyzed to determine the direction of the gaze of those viewer. In other embodiments, an array of image sensors may be used to recurringly capture images of viewers from different angles to obtain a 3D perspective of the eyes of viewers for analysis of the direction of their gaze. Given that the convergence point of viewers of 2D visual content is able to generally be assumed to be within the plane 281 of the display 280 such that the depth from the perspective of the viewers of the display is already known, the eye tracker 210 may be configured to track the movement and direction of only one eye of each viewer of the 2D version of visual content visually presented on the display 280.

Further, given that many of the different technologies that may be employed in the eye tracker 210 entail the use of at least one image sensor that could be used to recurringly capture images of viewers, the eye tracker 210 may additionally be operated by the processor element 250 to recurringly capture images of body movements and/or postures of one or more viewers. Alternatively, where the eye tracker 210 does not incorporate an image sensor of a type capable of capturing such images, the viewing device 200 may incorporate a separate image sensor (not shown) to recurringly capture such images. As previously mentioned, body movements indicative of physical discomfort by a viewer may be induced by (and thus, a manifestation of) viewing fatigue, and therefore, may be relevant observations for subsequent analysis. The processor element 250 stores indications of the observed eye movements, directions of lines of sight, and/or body movements or posturing as the 2D observation data 231. The processor element 250 provides the 2D observation data 231 to the analysis device 400, either by transmission via the network 999 or via removable storage.

In various embodiments, the viewing device 300 incorporates one or more of a processor element 350, a storage 360, a display 380, an eye tracker 310, and an interface 390 to couple the viewing device 300 to the network 999. The storage 360 stores one or more of a control routine 340, at least a portion of the visual data 138 and a 3D observation data 331. In executing a sequence of instructions of the control routine 340, the processor element 350 is caused to receive the visual data 138 from the source server 100 enabling a 3D visual presentation of visual content from the visual data 138. The processor element 350 then visually presents that 3D visual presentation on the display 380. As previously explained, the source server 100 provides a 3D version of visual content of the visual data 138 to viewing devices that provide a 3D visual portion such that the source server 100 provides both left side and right side imagery for each frame of the visual content to the viewing device 300

Figure 3:
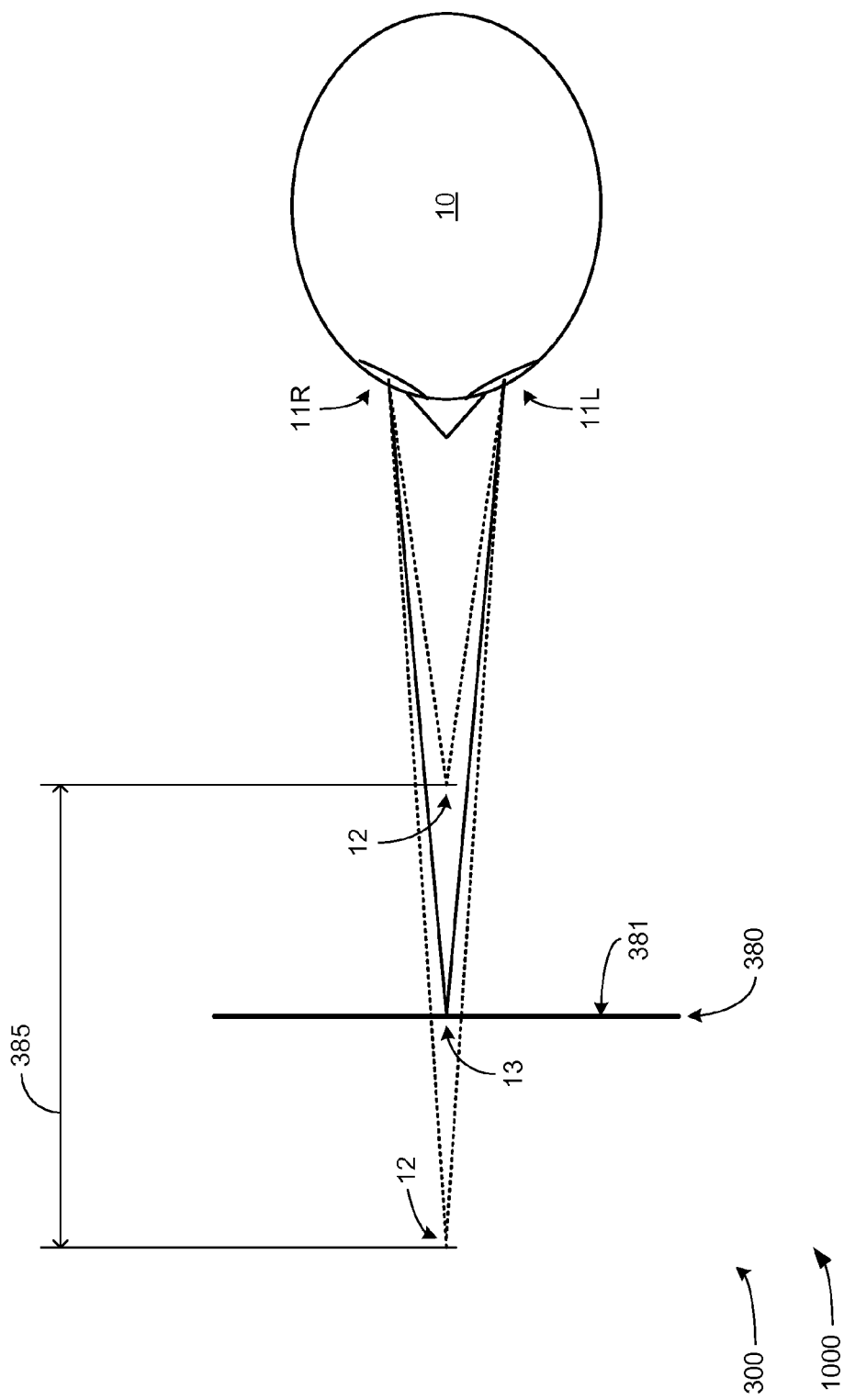
FIG. 3 illustrates aspects of viewing three-dimensional content.
Figure 4:
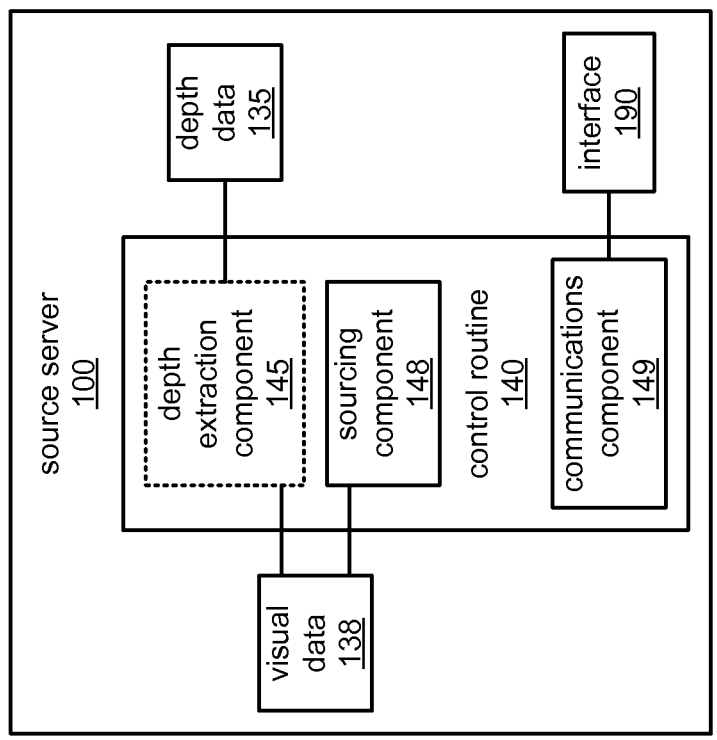
FIGS. 4, 5, 6 and 7 illustrate aspects of portions of the embodiment of FIG. 1.
Figure 6:
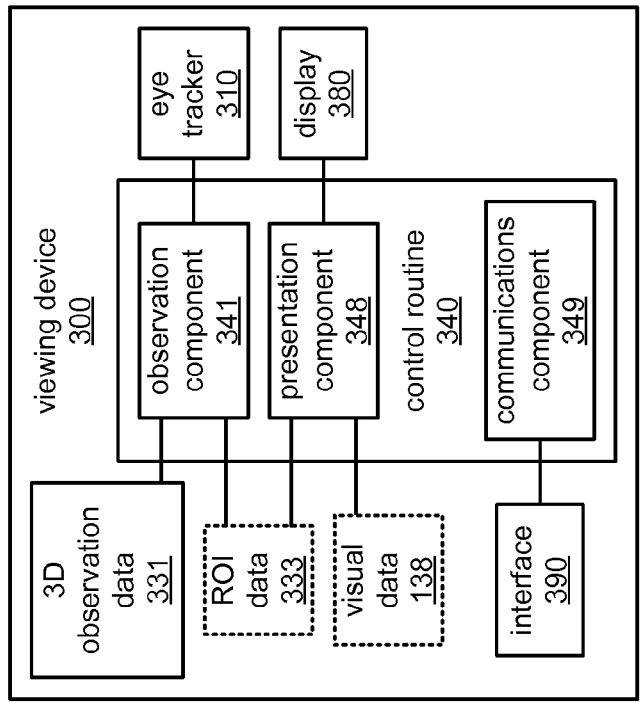
Figure 5:
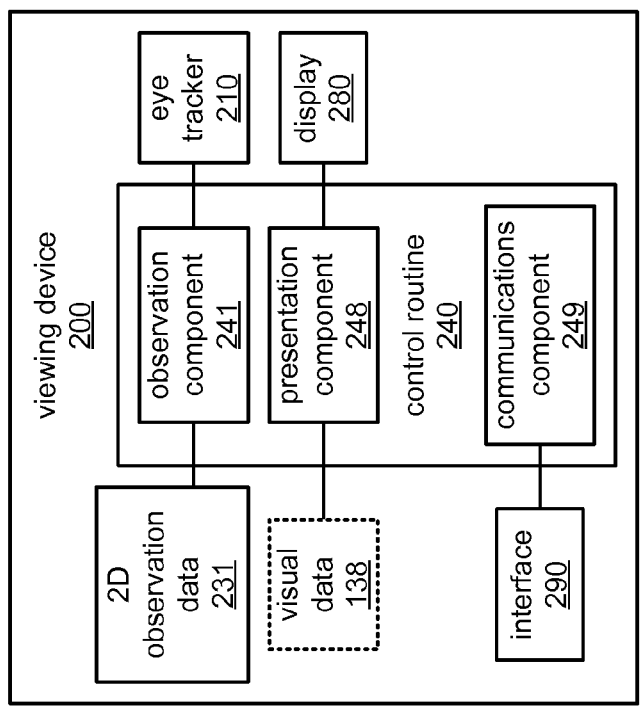
Figure 7:
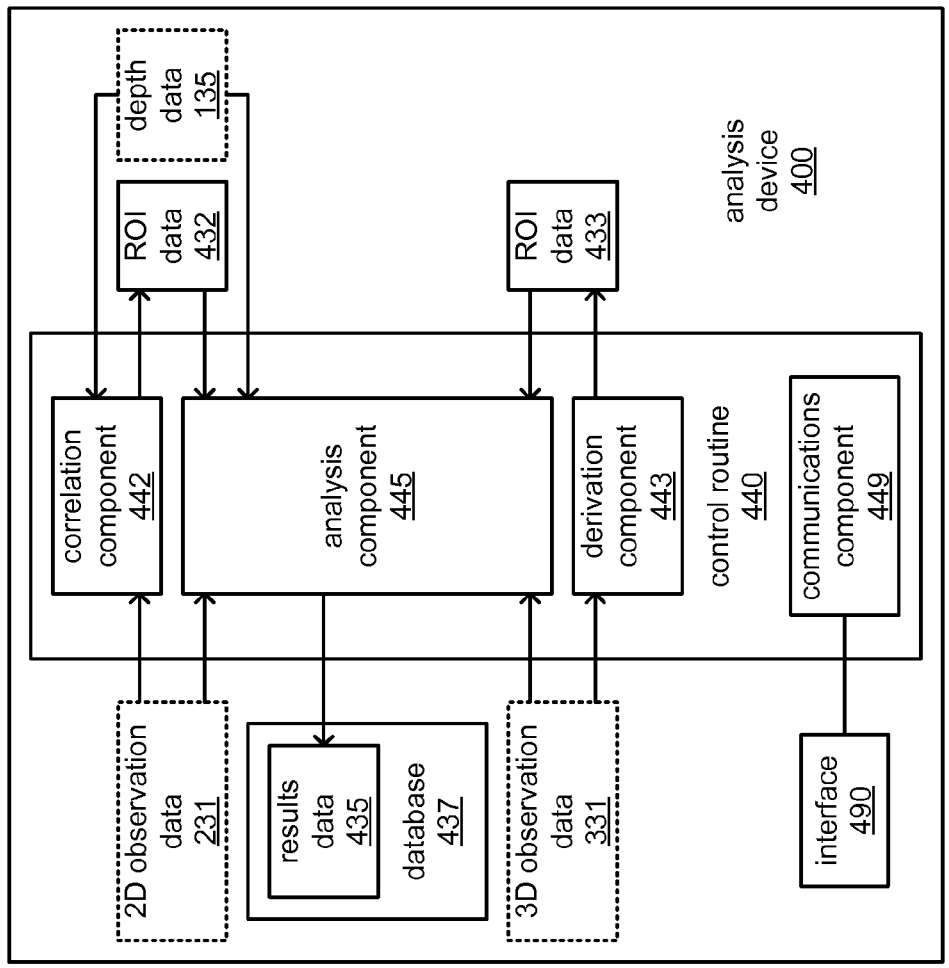

FIG. 3 depicts aspects of the viewer 10 viewing a 3D version of visual content on the display 380. Unlike the experience of viewing a 2D visual content in which the convergence point 12 and the common focal point 13 substantially coincide in three dimensions (as depicted in FIG. 2), the experience of viewing 3D visual content on any type of planar-shaped screen (whether a projector screen or a flat panel display) results in the locations of these two points having different depths from the perspective of the viewer 10 (i.e., different depths from the viewer's eyes 11L and 11R). 3D visual content includes depictions of objects that are meant to be perceived as closer to or further from the viewer 10 than the plane 381 of the display 380, and that perception of those objects at those different distances (i.e., depths) from the viewer 10 entails the convergence point 12 being positioned where those objects are. As a result, and as depicted, the convergence point 12 could be positioned either between the viewer 10 and the plane 381 of the display 380 or beyond the plane 381 of the display 380 from the perspective of the viewer.

However, it is the display 380 that visually presents those objects, and for the eyes 11L and 11R to see those objects clearly, the common focal point 13 must remain at the plane 381 of the display 380. In other words, the presentation of 3D visual imagery using any type of screen providing a viewing surface that exists in a single plane necessarily requires that the normal coincidence of the convergence point 12 and the common focal point 13 be broken. Although the visual cortex of the human brain can support such a disparity between the convergence point 12 and the common focal point 13, the fact that such a disparity does not normally occur in other situations results in the visual cortex having to work harder than normal to support such viewing of 3D visual content. This can result in viewing fatigue that manifests in various ways, including and not limited to headaches, dizziness, tiredness, eyestrain, a sick feeling, induced physical discomfort with a viewing position, etc.

Anecdotally, it is believed by some that the degree of such a disparity can influence either the severity of that fatigue or how quickly it sets in, with a greater degree of such disparity believed to be worse. Those who create 3D visual content often attempt to vary the degree of disparity for different objects in a scene as a tool for setting a mood of that scene. Another of their frequently used tools is varying the width of the range of perceived depths from the viewer 10 of all objects depicted in each frame (often called the depth bracket of a frame), which correspondingly varies the range of distances of the convergence point 12 from the eyes 11L and 11R of the viewer 10. Anecdotally, it is also believed by some that the width of the depth bracket can also influence the severity of fatigue and how quickly it sets in, with a greater width believed to be worse. FIG. 3 depicts what the depth bracket 385 for a frame would be if the depicted positions in front of and behind the plane 381 of the display 380 represented the closest and furthest perceived depths of objects in that frame. It should be noted that although FIG. 3 depicts the depth bracket 385 as extending through the depth from the viewer 10 at which the plane 381 of the display 380 exists, the depth bracket 385 may be entirely in front of or entirely behind the plane 381 of the display 380, depending on the depths of the objects in a given frame are perceived to be.

Returning to FIG. 1, as the 3D version of the visual content from the visual data 138 is visually presented on the display 380, the processor element 350 is further caused to operate the eye tracker 310 to track eye movements and lines of sight of both eyes of one or more viewers of that visual program on the display 380. As in the case of the eye tracker 210 of the viewing device 200, the eye tracker 310 may be based on any of a variety of technologies for detecting the direction of a gaze. However, unlike the eye tracker 210 that must detect the line of sight of only one eye of a viewer, the eye tracker 310 must detect the line of sight of both eyes of a viewer due to the need to use that information to derive the depth (distance) of the convergence point from the viewer. As a result, it is envisioned that the requirements of the eye tracker 310 are greater than those of the eye tracker 210. By way of example, the eye tracker 310 may incorporate one or more image sensors that are capable of capturing images at a higher resolution than those may be incorporated into the eye tracker 210, and/or the eye tracker 310 may incorporate more of them.

Further, where the eye tracker 310 incorporates one or more image sensors capable of being operated to capture images of viewer body posture or movement, then those image sensors may be operated by the processor element 350 to do so. However, where the eye tracker 310 employs a technology that results in it not incorporating such an image sensor, then the viewing device 300 may incorporate a separate image sensor (not shown) to capture images of viewer body posture and movement. The processor element 350 stores indications of the observed eye movements, directions of lines of sight, locations in three dimensions of points of convergence, and/or body movements or posturing as the 3D observation data 331. The processor element 350 provides the 3D observation data 331 to the analysis device 400, either by transmission via the network 999 or via removable storage.

The viewing devices 200 and 300 may each be installed in theatre auditoriums to enable screenings of the visual content from the visual data 138 to groups of viewers, and/or may each be a viewing device personally owned by one or more viewers in their homes for personal viewing of such visual content. Thus, it should be noted that although only one each of the viewing devices 200 and 300 are depicted and discussed herein, there could be a great many of each of these viewing devices in use by individual viewers. The viewing devices 200 and 300 may be employed by a creator of the visual data 138 to perform test screenings of the 2D and 3D versions as part of analyzing the effects on viewers of the 3D imagery. Alternatively or additionally, such test screenings may be performed in the homes of viewers through any of a variety of possible arrangements with those viewers. Such an arrangement could be a subscription arrangement by which such viewers are able to view movies and/or television programs as participants in such tests before they are released to a larger audience. Such test screenings may be conducted as part of preparing such visual content for wider release to the public, or as part of research to add statistical data to a body of knowledge of how viewers respond to the use of 3D imagery with various parameters.

In various embodiments, the analysis device 400 incorporates one or more of a processor element 450, a storage 460 and an interface 490 to couple the analysis device 400 to the network 999. The storage 460 stores one or more of a control routine 440, the depth data 135, the 2D observation data 231, the 3D observation data 331, region-of-interest (ROI) data 432 and 433, and a results data 435 possibly incorporated into a database 437. In executing a sequence of instructions of the control routine 440, the processor element 450 may be caused to receive one or more of the depth data 135, the 2D observation data 231 and the 3D observation data 331 via the network 999 from one or more of the source server 100, the viewing device 200 and the viewing device 300, respectively.

In preparation for the analysis of observations of viewer eye responses to the 2D and 3D versions of the visual content from the visual data 138, the processor element 440 correlates the depth data 135 with the 2D observation data 231 to derive the ROI data 432. As previously discussed, the depth data 135 is a per-frame depth map of the pixels for each frame of the visual content of the visual data 138 visually presented in 2D and 3D versions by the viewing devices 200 and 300, respectively. As also previously discussed, the 2D observation data 231 includes eye tracking data indicating the direction of the line of sight of the gaze of at least one eye of each of one or more viewers. From those indications of direction of line of sight for each frame of the 2D visual content, the processor element 400 determines where on the display 280 the line of sight of a viewer's gaze was directed. The processor element 400 then refers to the depth data 135 for the gazed-at portion of the display 280 for each frame to retrieve an indication of depth of the visual content at that gazed-at portion. The combination of an indication of where a viewer's gaze was directed on the display 280 (horizontally and visually from that viewer's perspective) and the depth of the visual content at that gazed-at location of the display 280 is stored for each frame of the visual content as the ROI data 432. Thus, the ROI data 432 is essentially made up of three-dimensional coordinates for each viewer for each frame of the 2D version of the visual content, indicating each viewer's region of interest for each frame of the 2D version of the visual content.

From the 3D observation data 331, the processor element 450 derives the ROI data 433. As previously discussed, the 3D observation data 331 includes eye tracking data indicating the lines of sight of each eye in each pair of eyes of one or more viewers of the 3D version. From those pairs of indications of lines of sight for each frame of the 3D visual content, the processor element 450 determines their convergence point in three dimensions. Thus, the ROI data 433 is also essentially made up of three-dimensional coordinates for each viewer for each frame of the 3D version of the visual content, indicating each viewer's region of interest for each frame of the 3D version of the visual content.

With the ROI data 432 and 433 created, the processor element 450 compares them, storing indications of instances of statistically significant degrees of difference in the region of interest in frames between 2D and 3D versions as part of the results data 435. Statistically significant differences between the regions of interest of the viewings of the 2D and 3D regions of interest may be indicators of viewing fatigue. This may be based on a presumption that the regions of interest observed in the viewing of the 2D version are more reflective of where the creators of the visual content intended to draw the gaze of viewers. Thus, where the region of interest from the viewing of the 3D version differs significantly from that of the viewing of the 2D version, it may be taken as an indication that the success in causing a viewer to look where desired in the 2D version was not replicated with the 3D version.

Some of these instances in which statistically significant differences in the regions of interest from the viewings of the 2D and 3D versions are identified may be instances of loss of "smooth pursuit" in which the eyes fail to follow horizontal and/or vertical movement of an object despite it moving at a speed and in a manner that is normally well within the ability of human eyes to follow with relatively smooth motion. The processor element 450 may analyze the ROI data 432 to detect instances of successfully performed smooth pursuit in the viewing of the 2D version, and then identify instances in the viewing of the 3D version where such success in smooth pursuit was not repeated as part of the comparison the ROI data 432 and 433. Such instances of a lack of smooth pursuit are taken as a manifestation of viewing fatigue.

The processor element 450 also compares the depth data 135 with the ROI data 433 from the viewing of the 3D version to identify instances of "depth escape" where a viewer's convergence point 12 remained substantially "stuck" at the plane 381 of the screen 380 despite the content at that location on the screen depicting an object at a depth that was significantly in front of or behind that plane 381. Such instances of where a viewer's convergence point 12 remains within the plane of the viewing surface of the display 380 despite indications in the depth data 135 of a significantly different depth are taken as an indication of resistance by that viewer's eyes 11L and 11R against changing the convergence point 12 to match the depth of an object in favor of resting by causing the convergence point 12 to substantially coincide with the common focal point 13. This is a manifestation of viewing fatigue.

Such a comparison between the depth data 135 and the ROI data 433 may also reveal instances of "slow vergence" where the depth of an object at a location on the display 380 changed, but the convergence point 12 is found to have not changed with that change in depth, or is found to have changed slowly such that the change in the convergence significantly lagged behind the change in depth. Such instances of a slow or lack of change in the convergence point 12 in response to a change of depth of an object, instead of responding speedily as normal, are taken as a manifestation of viewing fatigue.

The processor element 450 also analyzes the ROI data 433 from the viewing of the 3D version to identify instances of "screen escape" where the lines of sight of the eyes 11L and 11R are directed away from the display 380. Such instances of where a viewer looks away from a screen during a 3D visual presentation are frequently the result of a viewer seeking to rest their eyes by not looking at the 3D visual presentation, and is a manifestation of viewing fatigue.

The processor element 450 may also compare observations of body posture and/or movement of viewers indicated in the 2D observation data 231 and the 3D observation data 331 for instances of statistically significant differences. Among the statistically significant differences may be indications of viewers "fidgeting" or "shifting about" during viewing of the 3D version to a greater degree than during the viewing of the 2D version, which may be indications of physical discomfort arising from viewing fatigue.

Indications of instances of such events as a loss of smooth pursuit, depth escape, slow vergence, screen escape and/or movements to relieve physical discomfort are stored as part of the results data 435 in a manner that correlates them to what frames were visually presented when each of such instances occurred. Also stored in the results data 435 are indications of the range and location along the depth dimension of the depth bracket of each frame. Alternatively or additionally, indications of instances of viewing fatigue may presented to an operator of the analysis device 400, possibly visually via a display (not shown), audibly or in some other manner. With subsequent statistical analysis of the results data 435 for the piece of visual content of the visual data 138 or for the larger set of data of the database 437 may reveal associations and/or causal relationships between instances of these various described manifestations of viewing fatigue and particular characteristics of the depth bracket, instances of change in depth of objects, instances of horizontal and/or vertical movement of objects, etc.

It should be noted that although separate computing devices 100, 200, 300 and 400 are depicted and described as separately performing various functions of the viewing analysis system 1000, alternate embodiments are possible in which any two or more of these computing devices are combined into a single computing device that performs the functions of all of the computing devices so combined. Indeed, in still another embodiment, a single computing device may perform visual presentations of one or both of 2D and 3D versions of visual content, analyze the data indicating observations made of the viewers, and then automatically employ the results of the analysis to alter one or more parameters related to 3D presentation in a subsequent visual presentation of the 3D version.

In various embodiments, each of the processor elements 150, 250, 350 and 450 may include any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked.

In various embodiments, each of the storages 160, 260, 360 and 460 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 290, 390 and 490 may employ any of a wide variety of signaling technologies enabling corresponding ones of the computing devices 100, 200, 300 and 400 to be coupled through the network 999 as has been described. Each of these interfaces includes circuitry providing at least some of the requisite functionality to enable such coupling. However, this interface may also be at least partially implemented with sequences of instructions executed by corresponding ones of the processor elements 150, 250, 350 and 450 (e.g., to implement a protocol stack or other features). Where one or more portions of the network 999 employs electrically and/or optically conductive cabling, the interface 190 may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 999 entails the use of wireless signal transmission, the interface 190 may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although each of the interfaces 190 and 390 are depicted as a single block, one or more of these may include multiple interfaces that may be based on differing signaling technologies. This may be the case especially where one or more of these interfaces couples corresponding ones of the computing devices 100 and 300 to more than one network, each employing differing communications technologies.

FIGS. 4, 5, 6 and 7, taken together, illustrate block diagrams of portions of the block diagram of FIG. 1 depicted in greater detail. More specifically, aspects of the operating environments of each of the computing devices 100, 200, 300 and 400 are depicted, in which corresponding ones of the processor elements 150, 250, 350 and 450 are caused by execution of the control routines 140, 240, 340 and 440 to perform the aforedescribed functions. As will be recognized by those skilled in the art, each of these control routines, including the components of which each is composed, are selected to be operative on whatever type of processor or processors that are selected to implement corresponding ones of these processor elements.

In various embodiments, each of the control routines 140, 240, 340 and 440 may include a combination of an operating system, device drivers and/or application-level routines (e.g., so-called "software suites" provided on disc media, "applets" obtained from a remote server, etc.). Where an operating system is included, the operating system may be any of a variety of available operating systems, including without limitation, Windows™, OS X™, Linux®, or Android OS™. Where one or more device drivers are included, those device drivers may provide support for any of a variety of other components, whether hardware or software components, of corresponding ones of the computing devices 100, 200, 300 and 400.

Each of the control routines 140, 240, 340 and 440 includes a communications component 149, 249, 349 and 449, respectively, executable by corresponding ones of the processor elements 150, 250, 350 and 450 to operate corresponding ones of the interfaces 190, 290, 390 and 490 to transmit and receive signals via the network 999 as has been described. As will be recognized by those skilled in the art, each of these communications components are selected to be operable with whatever type of interface technology is selected to implement each of the corresponding ones of these interfaces.

The control routine 140 includes a sourcing component 148 executable by the processor element 150 to transmit 2D and/or 3D versions of visual content of the visual data 138 to one or both of the viewing devices 200 and 300, as has been described. As previously discussed, the provision of the 2D version to the viewing device 200 may entail providing only left side or right side imagery of the 3D visual content to the viewing device 200, or may entail deriving 2D frames by employing any of a variety of algorithms from that left side and right side imagery.

The control routine 140 may include a depth extraction component 145 executable by the processor element 150 to derive the depth data 135 representing depths maps for each frame of the visual content of the visual data 138 from the left side and right side imagery of that visual content. As has been discussed, such derivation of the depth data 135 by the source server 100 may or may not be necessary depending on the manner in which the 3D imagery of the visual content is generated.

Each of the control routines 240 and 340 include a presentation component 248 and 348, respectively, executable by corresponding ones of the processor elements 250 and 350 to visually present visual content of the visual data 138 on the displays 280 and 380. However, the presentation components 248 and 348 differ in that the presentation component 248 visually presents a 2D version of that visual content on the display 280, while the presentation component 348 visually presents a 3D version of that visual content. As previously discussed, while the viewing device 200 visually presents the 2D version, the viewing device may receive the 3D version from the source server 100. In such embodiments, the presentation component 248 may select one of the left side imagery or the right side imagery to visually present, or may derive the frames of the 2D version it presents from both the left side and right side imagery through any of a variety of known algorithms.

Each of the control routines 240 and 340 include an observation component 241 and 341 executable by the processor elements 250 and 350 to operate corresponding ones of the eye trackers 210 and 310 to capture viewer responses to the 2D and 3D visual presentations, respectively. Further, indications of various aspects of the viewer responses are stored by the observation components 241 and 341 as the 2D observation data 231 and the 3D observation data 331, respectively, both of which are then provided to the analysis device 400. As has been discussed, both of the eye trackers 210 and 310 are operated to monitor and determine directions of lines of sight (i.e., the directions of gaze) of eyes of viewers, though the eye tracker 310 is necessarily operated to do so for both eyes of a viewer to enable determination of convergence points while the eye tracker 210 need only be operated to do so for a single eye of a viewer. Further, as has also been discussed, each of the eye trackers 210 and 310 may be operated (or separate image sensors, not shown, may be operated) to capture images of body movement and/or posture of viewers to enable detection of instances of viewer movement consistent with feelings of physical discomfort possibly induced by viewing fatigue.

As previously discussed, in some embodiments, indications of the directions of the lines of sight of the gaze of each eye of each pair of eyes of each viewer are simply stored by the viewing device 300 as part of the 3D observation data 331. However, alternate embodiments are possible in which the observation component 341 additionally derives the convergence points of those pairs of lines of sight for each viewer for each frame of the visual content and stores indications of those convergence points in the 3D observation data 331. Further, alternate embodiments are possible in which the observation component 341 additionally or alternatively creates its own version of the ROI data 433 (e.g., the depicted ROI data 333), perhaps to enable some degree of analysis of the region of interest of one or more viewers for signs of the onset of viewing fatigue to enable adjustment of one or more parameters of the 3D visual presentation by the viewing device 300 as that visual presentation is in progress. By way of example, the viewing device 300 may automatically adjust one or more aspects of the depth bracket of subsequently presented frames in an effort to reduce viewing fatigue in response to detecting the onset of viewing fatigue from such analysis of earlier-presented frames.

The control routine 440 includes a correlation component 442 executable by the processor element 450 to correlate the depth data 135 with the 2D observation data 231 to derive the ROI data 432. As previously discussed, the depth data 135 is a per-frame depth map of the pixels for each frame of the visual content of the visual data 138 visually presented in 2D and 3D versions by the viewing devices 200 and 300, respectively. Again, from the indications of the direction of the line of sight of the gaze of at least one eye of each viewer for each frame of the 2D version, the correlation component 442 determines where on the display 280 the line of sight of a viewer's gaze was directed. The processor element 400 then refers to the depth data 135 for the gazed-at portion of the display 280 for each frame to retrieve an indication of depth of the visual content at that gazed-at portion. The combination of an indication of where a viewer's gaze was directed on the display 280 (horizontally and visually from that viewer's perspective) and the depth of the visual content at that gazed-at location of the display 280 is stored for each frame of the visual content as the ROI data 432. Again, the ROI data 432 is essentially made up of three-dimensional coordinates for each viewer for each frame of the 2D version of the visual content, thereby indicating each viewer's region of interest for each frame of the 2D version of the visual content.

The control routine 440 includes a derivation component 443 executable by the processor element 450 to derive the ROI data 433 from the 3D observation data 331. As previously discussed, the 3D observation data 331 includes eye tracking data indicating the lines of sight of each eye in each pair of eyes of each viewer of the 3D version. From those pairs of indications of lines of sight for each frame of the 3D visual content, the derivation component determines their convergence point in three dimensions. Again, the ROI data 433 is also essentially made up of three-dimensional coordinates for each viewer for each frame of the 3D version of the visual content, thereby indicating each viewer's region of interest for each frame of the 3D version of the visual content.

The control routine 440 includes an analysis component 445 executable by the processor element 450 to perform various analyses of one or more of the depth data 135, the 2D observation data 231, the 3D observation data 331, and the ROI data 432 and 433, as well as various analyses of comparisons between two or more of these, as has been described. The results of these analyses, including indications of possible instances of viewing fatigue in the viewing of the 3D version of the visual content from the visual data 138, are stored as the results data 135 for that visual content. As has been discussed, the results data 435 may be added to a database 437 made up of such results from the comparative viewings of 2D and 3D versions of other pieces of visual content.

As previously discussed, such analysis as may be performed by the analysis component 445 includes comparing the ROI 432 and 433. In such a comparison, instances of statistically significant differences in the region of interest for individual frames between the 2D and 3D versions are identified, and indications of such instances are stored as part of the results data 435. Statistically significant differences between the regions of interest of the viewings of the 2D and 3D regions of interest may be indicators of viewing fatigue. Also in such a comparison, instances of sequences of frames in which statistically significant differences in the regions of interest between viewings of 2D and 3D versions are identified may indicate instances of loss of "smooth pursuit" in which the eyes fail to follow horizontal and/or vertical movement of an object despite it moving at a speed and in a manner that is normally well within the ability of human eyes to do so. A determination of whether or not there was movement present in that sequence that human eyes should be able to follow may be made by analysis of the movement of the region of interest indicated through that sequence in the ROI data 432. Where identified, indications of instances of loss of smooth pursuit are also stored in the results data 435.

As also previously discussed, such analysis may also include comparing the depth data 135 to the ROI data 433. Instances of a statistically significant difference between the region of interest in a frame indicated in the ROI data 433 for the 3D version viewing and the depth for same location in the same frame indicated in the depth data 135 for 2D version viewing that are identified may be instances of "depth escape" where a viewer's convergence point remains substantially within the plane 381 of the display 380. Such indications of such instances are stored in the results data 435 as another possible indication of viewing fatigue. Also in such a comparison, instances of sequences of frames in which statistically significant differences develop between changes of depth indicated as occurring in the depth data 135 and changes in the depth of a convergence point indicated in the ROI data 433 may indicate instances of "slow vergence" where the eyes fail to move sufficiently quickly (or at all) to change the vergence point to follow the indicated change of depth. Where identified, indications of instances of slow vergence are also stored in the results 435.

The analysis component 445 also stores indications of such events as "screen escape" and viewer body movements consistent with efforts to change viewing position to alleviate fatigue-induced physical discomfort are also stored as part of the results data 435. Further, indications of the range and location of the depth bracket along the depth dimension in the 3D version of each frame of the visual content are also stored as part of the results data 435.

Figure 8:
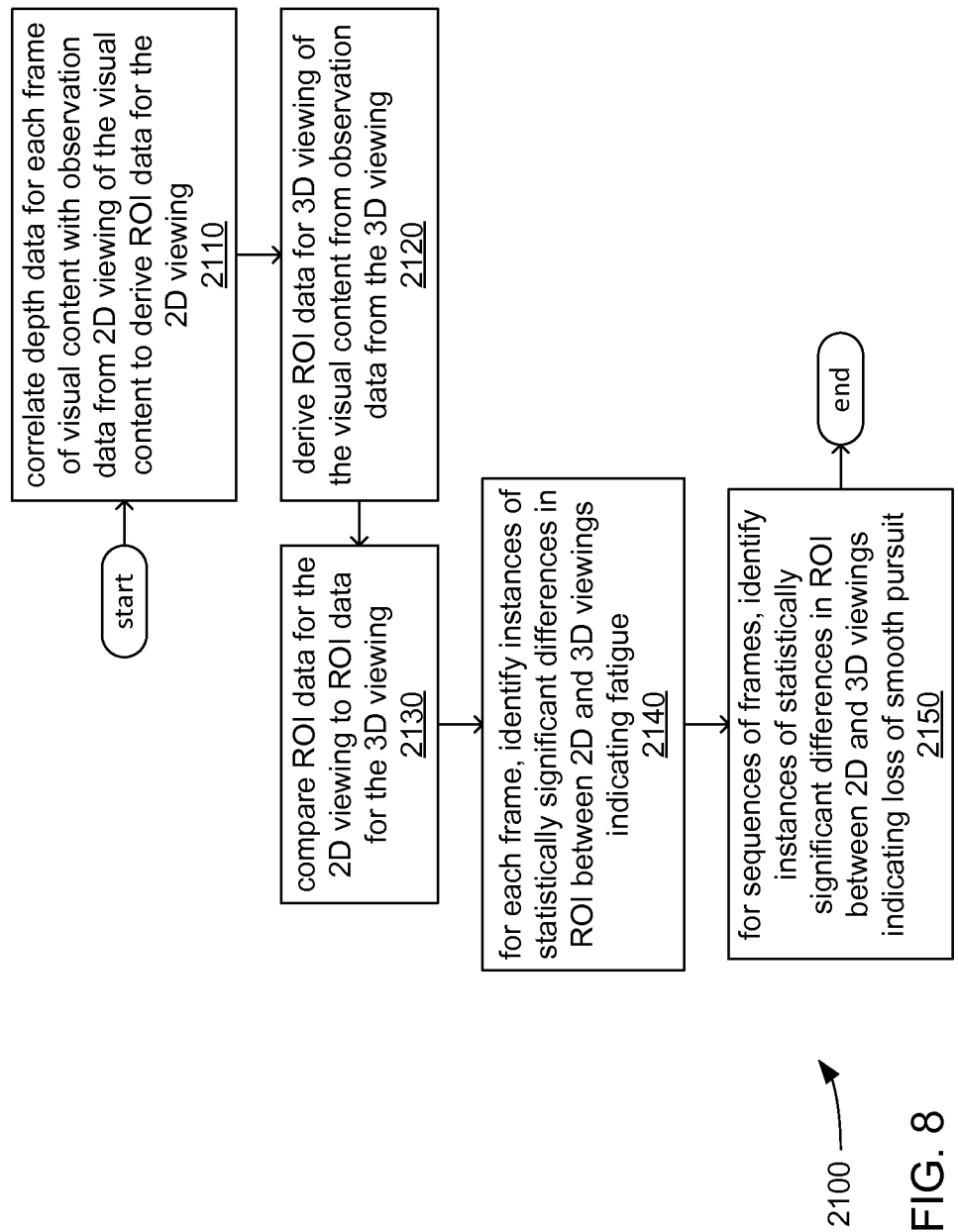
FIG. 8 illustrates an embodiment of a first logic flow.

FIG. 8 illustrates one embodiment of a logic flow 2100. The logic flow 2100 may be representative of some or all of the operations executed by one or more embodiments described herein. More specifically, the logic flow 2100 may illustrate operations performed by the processor element 450 of the analysis device 400 in executing at least the control routine 440.

At 2110, a computing device (e.g., the analysis device 400) correlates depth data for each frame of a piece of visual content (e.g., a movie, a television program, etc.) with observation data of viewers of a visual presentation of the 2D version of the visual content to derive region of interest (ROI) data for that 2D viewing. As has been discussed, in the 2D viewing, the depth of any point of convergence of the lines of sight of their eyes is normally within the plane of the screen of whatever display device is used in the 2D visual presentation (e.g., a projector screen, a flat panel monitor, etc.). Thus, a depth map indicating the depths of all of the pixels in each frame of the visual content must either be derived from the left side and right side visual imagery for each frame, or must be provided as a byproduct of whatever process is used to create the 3D version of the visual content. As a result, the ROI data for the 2D viewing indicates the horizontal and vertical coordinates of where viewers looked at the screen correlated with the depth indicated in the depth data for what was shown at that location on the screen in a manner resembling 3D coordinates.

At 2120, the computing device derives ROI data for a 3D viewing of the visual content in which the 3D version is visually presented to viewers. The computing device derives this ROI data from observation data of the viewers of that 3D viewing. As previously explained, the ROI data derived from the observation data from the 3D viewing indicates 3D coordinates of the convergence points of viewers for each frame visually presented in 3D.

At 2130, the computing device compares the ROI data for the 2D viewing to the ROI data for the 3D viewing. At 2140, for each frame of the visual content, the computing device identifies instances of statistically significant differences in the ROI data of the 2D and 3D viewings, such instances possibly indicative of viewing fatigue. As previously discussed, the ROI of each frame of the 2D viewing is assumed to most closely match the intent of the creators of the visual content in terms of causing viewers to look at particular objects depicted in the visual content. Where the viewers in the 3D viewing significantly differ in where their gaze is directed from where viewers in the 3D viewing directed their gaze, the assumption is made that the 3D version was not as successful as the 2D version in directing the gaze of the viewers, and it is assumed that this may be due to fatigue forestalling the viewers in the 3D viewing from doing so.

At 2150, the computing device identifies sequences of frames in which statistically significant differences in the ROI data of 2D and 3D viewings persisted throughout multiple frames, such instances possibly indicative of loss of smooth pursuit. As has been discussed, where viewing fatigue sets in, human eyes may not be able to follow movement as smoothly or at all.

Figure 9:
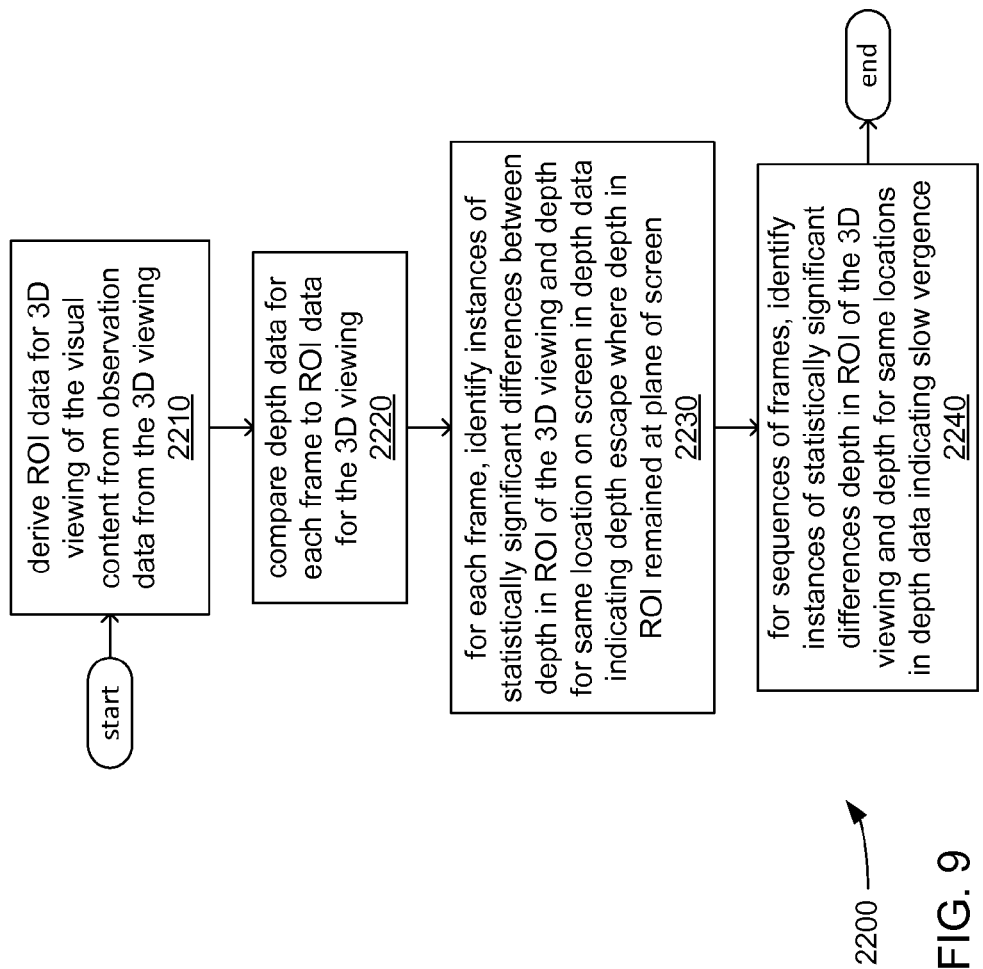
FIG. 9 illustrates an embodiment of a second logic flow.

FIG. 9 illustrates one embodiment of a logic flow 2200. The logic flow 2200 may be representative of some or all of the operations executed by one or more embodiments described herein. More specifically, the logic flow 2200 may illustrate operations performed by the processor element 450 of the analysis device 400 in executing at least the control routine 440.

At 2210, the computing device (e.g., the analysis device 400) derives ROI data for a 3D viewing of the visual content in which the 3D version is visually presented to viewers. The computing device derives this ROI data from observation data of the viewers of that 3D viewing. As previously explained, the ROI data derived from the observation data from the 3D viewing indicates 3D coordinates of the convergence points of viewers for each frame visually presented in 3D.

At 2220, the computing device compares depth data for each frame of the visual content to the depths of convergence points indicated in the ROI data for the 3D viewing for each corresponding frame. At 2230, for each frame of the visual content, the computing device identifies instances of statistically significant differences between the depth indicated in the ROI for the 3D viewing and the depth indicated in the depth data for the same location on the screen, and where that depth indicated in that ROI was substantially at the plane of the screen. Such instances may be indicative of depth escape, where as previously explained, a viewer's eyes resist adjusting the depth of their convergence point away from the depth of the plane of the screen (e.g., the plane 381 of the screen 380 of the viewing device 300 employed in a 3D viewing).

At 2240, the computing device identifies sequences of frames in which statistically significant differences between the depth indicated in the ROI for the 3D viewing and the depth indicated in the depth data for the same locations on the screen for each of those frames, such instances possibly indicative of slow vergence. As has been discussed, where viewing fatigue has set in, human eyes may not be able to change the depth of their convergence point quickly enough (or at all) to keep up with changes in depth of an object at a given location through multiple frames.

Figure 10:
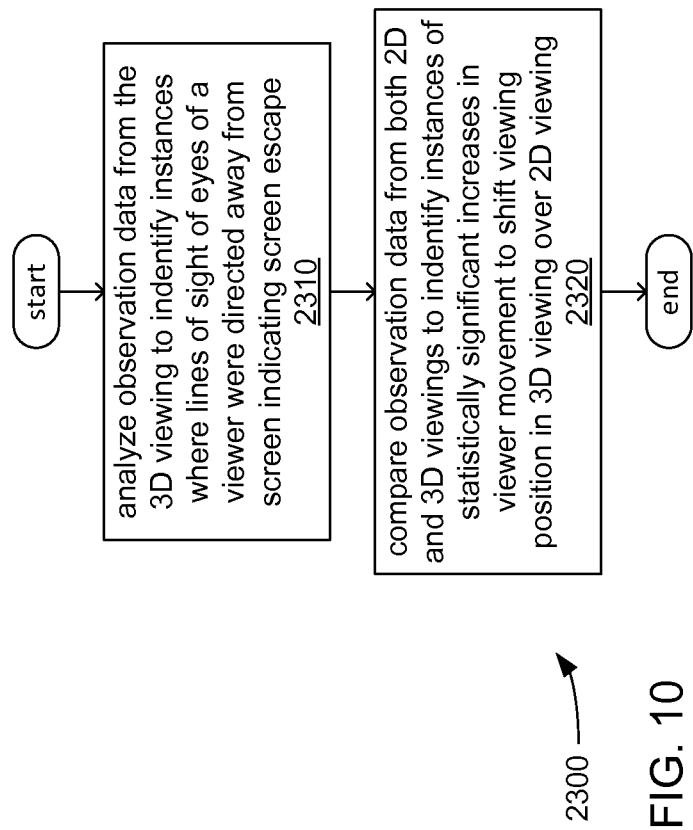
FIG. 10 illustrates an embodiment of a third logic flow.

FIG. 10 illustrates one embodiment of a logic flow 2300. The logic flow 2300 may be representative of some or all of the operations executed by one or more embodiments described herein. More specifically, the logic flow 2300 may illustrate operations performed by the processor element 450 the analysis device 400 in executing at least the control routine 440.

At 2310, a computing device (e.g., the analysis device 400) analyzes observation data of viewers of a 3D version of a piece of visual content to identify instances where the lines of sight of a viewer were directed away from the screen on which the 3D version of the visual content was visually presented, such instances possibly indicative of screen escape. As has been discussed, where viewing fatigue sets in, a viewer may look away from a screen on which a 3D version of visual content is visually presented in an effort to rest their eyes.

At 2320, the computing device compares the observation data of visual presentation of the 3D version of the content (i.e., the 3D viewing) to observation data of a 2D viewing in which the 2D version of the same visual content is visually presented to identify statistically significant increases in viewer movements to shift about in their viewing positions. Such an increase in shifting about may be to alleviate viewer discomfort in their viewing position induced by viewing fatigue.

Figure 11:
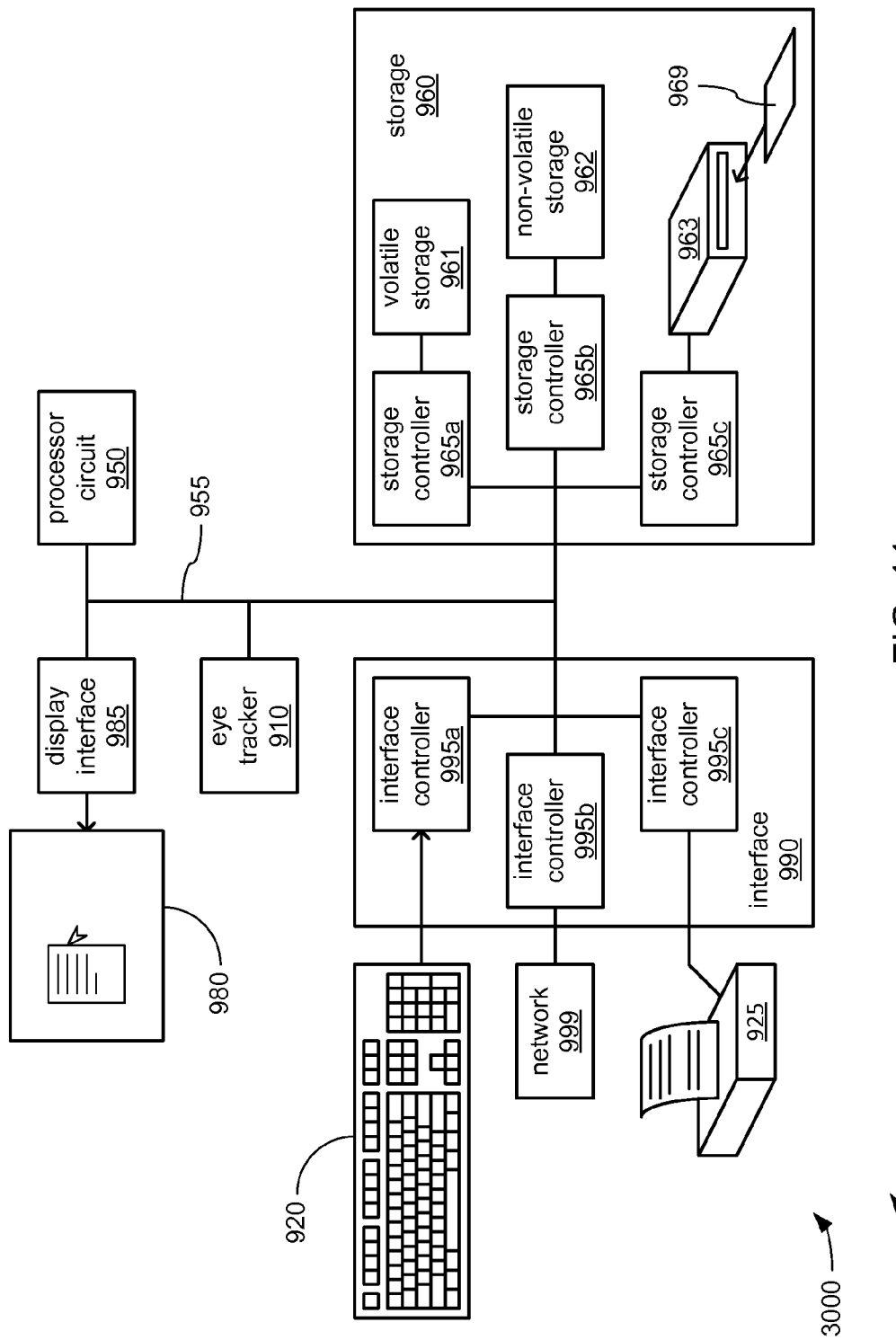
FIG. 11 illustrates an embodiment of a processing architecture.

FIG. 11 illustrates an embodiment of an exemplary processing architecture 3000 suitable for implementing various embodiments as previously described. More specifically, the processing architecture 3000 (or variants thereof) may be implemented as part of one or more of the computing devices 100, 200, 300 or 400. It should be noted that components of the processing architecture 3000 are given reference numbers in which the last two digits correspond to the last two digits of reference numbers of components earlier depicted and described as part of these computing devices. This is done as an aid to correlating such components of these computing devices with components of this exemplary processing architecture.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3000, a computing device incorporates at least a processor element 950, a storage 960, an interface 990 to other devices, and coupling 955. Depending on various aspects of a computing device implementing the processing architecture 3000, including its intended use and/or conditions of use, such a computing device may further incorporate additional components, such as without limitation, an eye tracker 910.

The coupling 955 incorporates one or more buses, point-to-point interconnects, transceivers, buffers, crosspoint switches, and/or other conductors and/or logic that communicatively couples at least the processor element 950 to the storage 960. The coupling 955 may further couple the processor element 950 to one or more of the interface 990 and the display interface 985 (depending on which of these and/or other components are also present). With the processor element 950 being so coupled by couplings 955, the processor element 950 is able to perform the various ones of the tasks described at length, above, for the computing device 100 and/or the controller 200. The coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor element 950 (corresponding to one or more of the processor elements 150, 250, 350 and 450) may include any of a wide variety of commercially available processors, employing any of a wide variety of technologies and implemented with one or more cores physically combined in any of a number of ways.

As previously discussed, the storage 960 (corresponding to one or more of the storages 160, 260, 360 and 460) may include one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor element 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of removable machine-readable storage media 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage media 969.

One or the other of the volatile storage 961 or the non-volatile storage 962 may include an article of manufacture in the form of a machine-readable storage media on which a routine comprising a sequence of instructions executable by the processor element 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 950 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor element 950 as that routine is executed.

As previously discussed, the interface 990 (corresponding to the interfaces 190, 290, 390 and 490) may employ any of a variety of signaling technologies corresponding to any of a variety of communications technologies that may be employed to communicatively couple a computing device to one or more other devices. Again, one or both of various forms of wired or wireless signaling may be employed to enable the processor element 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also incorporate the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices 100, 200, 300 and 400 may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus to evaluate three-dimensional viewing experiences includes a processor element; and logic to compare a first region of interest (ROI) data associated with a first viewer of a first visual presentation of a two-dimensional (2D) version of visual content to a second ROI data associated with a second viewer of a second visual presentation of a three-dimensional (3D) version of the visual content, and identify an instance of a statistically significant difference in a region of interest between the first ROI data and the second ROI data for at least one frame of the visual content indicative of an instance of viewing fatigue of the second viewer.

The above example of an apparatus in which the logic is to identify instances of statistically significant differences in regions of interest between the first and second ROI data for a sequence of frames of the visual content indicative of loss of smooth pursuit by the second viewer.

Either of the above examples of an apparatus in which the logic is to derive the first ROI data by correlation of a depth data comprising a depth map for pixels of the at least one frame with a first observation data that indicates for the at least one frame a line of sight of an eye of the first viewer.

Any of the above examples of an apparatus in which the logic is to derive the second ROI data from a second observation data that indicates for the at least one frame a first line of sight of a first eye of the second viewer and a second line of sight of a second eye of the second viewer.

Any of the above examples of an apparatus in which the logic is to compare the second ROI data to a depth data comprising a depth map for pixels of the at least one frame, and identify an instance of a statistically significant difference between a depth in the second ROI data and a depth in the depth data for the at least one frame indicative of viewing fatigue.

Any of the above examples of an apparatus in which the viewing fatigue includes depth escape.

Any of the above examples of an apparatus in which the logic is to identify instances of statistically significant differences between depths in the second ROI data and the depth data for a sequence of frames of the visual content indicative of slow vergence.

Any of the above examples of an apparatus in which the logic is to receive visual data comprising the 3D version of the visual content, and visually present the 3D version on the display as the second visual presentation.

Any of the above examples of an apparatus in which the logic is to use the eye tracker to track a first line of sight of a first eye of the second viewer and a second line of sight of a second eye of the second viewer for the at least one frame.

Any of the above examples of an apparatus in which the logic is to determine a convergence point of the first and second lines of sight of the second viewer for the at least one frame.

An example of another apparatus to evaluate three-dimensional viewing experiences includes an eye tracker to track a first line of sight of a first eye of a first viewer and a second line of sight of a second eye of the first viewer; and logic to visually present a 3D (three-dimensional) version of visual content on a display to the first viewer, determine a convergence point of the first and second lines of sight relative to the display for at least one frame of the visual content, compare a depth of the convergence point to a depth indicated in a depth data for the at least one frame; and identify an instance of a statistically significant difference between the depth of the convergence point and the depth indicated in the depth data for the at least one frame indicative of an instance of viewing fatigue of the first viewer.

The above example of another apparatus in which the logic is to compare the depth of the convergence point to the depth of the plane of the display, and determine the instance of viewing fatigue to be an instance of depth escape in response to substantial coincidence of the depth of the convergence point with the depth of the plane of the display.

Either of the above examples of another apparatus in which the logic is to identify instances of statistically significant differences between depths of convergence of multiple convergence points of the first and second lines of sight and depths indicated in the depth data for a sequence of frames of the visual content indicative of slow vergence of the first viewer.

Any of the above examples of another apparatus in which the logic is to compare the convergence point to a region of interest indicated in a ROI data derived from visual presentation of a 2D (two-dimensional) version of the visual content for the at least one frame, and identify an instance of a statistically significant difference between the convergence point and the region of interest for the at least one frame indicative of viewing fatigue.

An example of a computer-implemented method of evaluating three-dimensional viewing experiences includes comparing a first region of interest (ROI) data associated with a first viewer of a first visual presentation of a two-dimensional (2D) version of visual content to a second ROI data associated with a second viewer of a second visual presentation of a three-dimensional (3D) version of the visual content, identifying a first instance of viewing fatigue of the second viewer by identifying a statistically significant difference in a region of interest between the first ROI data and the second ROI data for at least one frame of the visual content, and presenting an indication of the first instance of viewing fatigue.

The above example of a computer-implemented method in which the method includes identifying loss of smooth pursuit by identifying instances of statistically significant differences in regions of interest between the first and second ROI data for a sequence of frames of the visual content.

Either of the above examples of a computer-implemented method in which the method includes deriving the first ROI data by correlating a depth data comprising a depth map for pixels of the at least one frame with a first observation data that indicates for the at least one frame a line of sight of an eye of the first viewer.

Any of the above examples of a computer-implemented method in which the method includes deriving the second ROI data from a second observation data that indicates for the at least one frame a first line of sight of a first eye of the second viewer and a second line of sight of a second eye of the second viewer.

Any of the above examples of a computer-implemented method in which the method includes comparing the second ROI data to a depth data comprising a depth map for pixels of the at least one frame, and identifying a second instance of viewing fatigue by identifying an instance of a statistically significant difference between a depth in the second ROI data and a depth in the depth data for the at least one frame.

Any of the above examples of a computer-implemented method in which the second instance of viewing fatigue comprising depth escape.

Any of the above examples of a computer-implemented method in which the method includes identifying slow vergence of the second viewer by identifying instances of statistically significant differences between depths in the second ROI data and the depth data for a sequence of frames of the visual content.

Any of the above examples of a computer-implemented method in which the method includes receiving visual data comprising the 3D version of the visual content, visually presenting the 3D version on the display as the second visual presentation, track a first line of sight of a first eye of the second viewer and a second line of sight of a second eye of the second viewer for the at least one frame, and determine a convergence point of the first and second lines of sight of the second viewer for the at least one frame.

Any of the above examples of a computer-implemented method in which the method includes altering a depth bracket of another frame of the visual content following the at least one frame in response to identifying the first instance of viewing fatigue.

An example of an apparatus to manage a user interface includes means for performing any of the above examples of a computer-implemented method.

An example of at least one machine-readable storage medium includes instructions that when executed by a computing device, cause the computing device to visually present a three-dimensional (3D) version of visual content on a display to a first viewer in a first visual presentation, track a first line of sight of a first eye of a first viewer and a second line of sight of a second eye of the first viewer, derive a first region of interest (ROI) data associated with the first viewer for at least one frame of the visual content by determining a convergence point of the first and second lines of sight relative to the display for the at least one frame, compare the first ROI data to a second ROI data associated with a second viewer of a second visual presentation of a 2D (two-dimensional) version of the visual content, and identify an instance of a statistically significant difference in a region of interest between the first ROI data and the second ROI data for the at least one frame indicative of an instance of viewing fatigue of the first viewer.

The above example of at least one machine-readable storage medium in which the computing device is caused to identify a loss of smooth pursuit by the first viewer by identifying instances of statistically significant differences in regions of interest between the first and second ROI data for a sequence of frames of the visual content.

Either of the above examples of at least one machine-readable storage medium in which the computing device is caused to compare the first ROI data to a depth data comprising a depth map for pixels of the at least one frame, and identify an instance of a statistically significant difference between a depth in the first ROI data and a depth in the depth data for the at least one frame indicative of viewing fatigue.

Any of the above examples of at least one machine-readable storage medium in which the computing device is caused to identify slow vergence by the first view by identifying instances of statistically significant differences between depths in the first ROI data and the depth data for a sequence of frames of the visual content.

Any of the above examples of at least one machine-readable storage medium in which the computing device is caused to visually present the 2D version on the display as the first visual presentation, and track a line of sight of an eye of the second viewer for the at least one frame.

Any of the above examples of at least one machine-readable storage medium in which the computing device is caused to alter a depth bracket of another frame of the visual content following the at least one frame in response to identifying the first instance of viewing fatigue.

An example of still another apparatus to evaluate three-dimensional viewing experiences includes means for visually presenting a three-dimensional (3D) version of visual content on a display to a first viewer in a first visual presentation, tracking a first line of sight of a first eye of a first viewer and a second line of sight of a second eye of the first viewer, deriving a first region of interest (ROI) data associated with the first viewer for at least one frame of the visual content by determining a convergence point of the first and second lines of sight relative to the display for the at least one frame, comparing the first ROI data to a second ROI data associated with a second viewer of a second visual presentation of a 2D (two-dimensional) version of the visual content, and identifying an instance of a statistically significant difference in a region of interest between the first ROI data and the second ROI data for the at least one frame indicative of an instance of viewing fatigue of the first viewer.

The above example of still another apparatus includes means for identifying a loss of smooth pursuit by the first viewer by identifying instances of statistically significant differences in regions of interest between the first and second ROI data for a sequence of frames of the visual content.

Either of the above examples of still another apparatus includes means for comparing the first ROI data to a depth data comprising a depth map for pixels of the at least one frame, and identifying an instance of a statistically significant difference between a depth in the first ROI data and a depth in the depth data for the at least one frame indicative of viewing fatigue.

Any of the above examples of still another apparatus includes means for identifying slow vergence by the first view by identifying instances of statistically significant differences between depths in the first ROI data and the depth data for a sequence of frames of the visual content.

Any of the above examples of still another apparatus includes means for visually presenting the 2D version on the display as the first visual presentation, and tracking a line of sight of an eye of the second viewer for the at least one frame.

Any of the above examples of still another apparatus includes means for altering a depth bracket of another frame of the visual content following the at least one frame in response to identifying the first instance of viewing fatigue.

The invention claimed is:

1. An apparatus comprising:
an eye tracker to track a first line of sight of a first eye of a first viewer and a second line of sight of a second eye of the first viewer; and
logic to:
visually present a 3D (three-dimensional) version of visual content on a display to the first viewer;
determine a convergence point of the first and second lines of sight relative to the display for at least one frame of the visual content;
compare a depth of the convergence point to a depth indicated in a depth data for the at least one frame;
identify an instance of a statistically significant difference between the depth of the convergence point and the depth indicated in the depth data for the at least one frame indicative of an instance of viewing fatigue of the first viewer;
compare the depth of the convergence point to the depth of the plane of the display; and
determine the instance of viewing fatigue to be an instance of depth escape in response to substantial coincidence of the depth of the convergence point with the depth of the plane of the display.

2. The apparatus of claim 1, the logic to:
compare the convergence point to a region of interest indicated in a ROI data derived from visual presentation of a 2D (two-dimensional) version of the visual content for the at least one frame; and
identify an instance of a statistically significant difference between the convergence point and the region of interest for the at least one frame indicative of viewing fatigue.

3. A computer-implemented method comprising:
comparing a first region of interest (ROI) data associated with a first viewer of a first visual presentation of a two-dimensional (2D) version of visual content to a second ROI data associated with a second viewer of a second visual presentation of a three-dimensional (3D) version of the visual content;

identifying a first instance of viewing fatigue of the second viewer by identifying a statistically significant difference in a region of interest between the first ROI data and the second ROI data for at least one frame of the visual content;

presenting an indication of the first instance of viewing fatigue;

comparing the second ROI data to a depth data comprising a depth map for pixels of the at least one frame;

identifying a second instance of viewing fatigue by identifying an instance of a statistically significant difference between a depth in the second ROI data and a depth in the depth data for the at least one frame; and identifying slow vergence of the second viewer by identifying instances of statistically significant differences between depths in the second ROI data and the depth data for a first sequence of frames of the visual content.

4. The computer-implemented method of claim 3, comprising identifying loss of smooth pursuit by identifying instances of statistically significant differences in regions of interest between the first and second ROI data for a second sequence of frames of the visual content.

5. The computer-implemented method of claim 3, comprising deriving the first ROI data by correlating the depth data with a first observation data that indicates for the at least one frame a line of sight of an eye of the first viewer.

6. The computer-implemented method of claim 3, comprising deriving the second ROI data from a second observation data that indicates for the at least one frame a first line of sight of a first eye of the second viewer and a second line of sight of a second eye of the second viewer.

7. The computer-implemented method of claim 3, comprising:
receiving visual data comprising the 3D version of the visual content;
visually presenting the 3D version on the display as the second visual presentation;
track a first line of sight of a first eye of the second viewer and a second line of sight of a second eye of the second viewer for the at least one frame; and
determine a convergence point of the first and second lines of sight of the second viewer for the at least one frame.

8. The computer-implemented method of claim 3, comprising altering a depth bracket of another frame of the visual content following the at least one frame in response to identifying the first instance of viewing fatigue.

9. A non-transitory machine-readable storage medium comprising instructions that when executed by a computing device, cause the computing device to:
visually present a three-dimensional (3D) version of visual content on a display to a first viewer in a first visual presentation;
track a first line of sight of a first eye of a first viewer and a second line of sight of a second eye of the first viewer;
derive a first region of interest (ROI) data associated with the first viewer for at least one frame of the visual content by determining a convergence point of the first and second lines of sight relative to the display for the at least one frame;

compare the first ROI data to a second ROI data associated with a second viewer of a second visual presentation of a 2D (two-dimensional) version of the visual content;
identify an instance of a statistically significant difference in a region of interest between the first ROI data and the second ROI data for the at least one frame indicative of an instance of viewing fatigue of the first viewer; and
identify a loss of smooth pursuit by the first viewer by identifying instances of statistically significant differences in regions of interest between the first and second ROI data for a sequence of frames of the visual content.

10. The non-transitory machine-readable storage medium of claim 9, the computing device caused to:
compare the first ROI data to a depth data comprising a depth map for pixels of the at least one frame; and
identify an instance of a statistically significant difference between a depth in the first ROI data and a depth in the depth data for the at least one frame indicative of viewing fatigue.

11. The non-transitory machine-readable storage medium of claim 9, the computing device caused to:
visually present the 2D version on the display as the first visual presentation; and
track a line of sight of an eye of the second viewer for the at least one frame.

12. The non-transitory machine-readable storage medium of claim 9, the computing device caused to alter a depth bracket of another frame of the visual content following the at least one frame in response to identifying the first instance of viewing fatigue.

13. An apparatus comprising:
an eye tracker to track a first line of sight of a first eye of a first viewer and a second line of sight of a second eye of the first viewer; and
logic to:
visually present a 3D (three-dimensional) version of visual content on a display to the first viewer;
determine a convergence point of the first and second lines of sight relative to the display for at least one frame of the visual content;
compare a depth of the convergence point to a depth indicated in a depth data for the at least one frame;
identify an instance of a statistically significant difference between the depth of the convergence point and the depth indicated in the depth data for the at least one frame indicative of an instance of viewing fatigue of the first viewer; and
identify instances of statistically significant differences between depths of convergence of multiple convergence points of the first and second lines of sight and depths indicated in the depth data for a sequence of frames of the visual content indicative of slow vergence of the first viewer.

14. The apparatus of claim 13, the logic to:
compare the convergence point to a region of interest indicated in a ROI data derived from visual presentation of a 2D (two-dimensional) version of the visual content for the at least one frame; and
identify an instance of a statistically significant difference between the convergence point and the region of interest for the at least one frame indicative of viewing fatigue.

* * * * *